United States Patent [19]

Plesko et al.

[11] Patent Number: 4,758,544

[45] Date of Patent: Jul. 19, 1988

[54] CATALYST COMPOSITION AND HYDROPROCESSING OF OILS USING SAME

[75] Inventors: Ronald W. Plesko, Allison Park; Allen E. Somers, Pittsburgh, both of Pa.; John J. Stanulonis, Solon, Ohio; Harold E. Swift, Gibsonia; Roger F. Vogel, Butler, both of Pa.

[73] Assignee: Chevron Research Company, San Francisco, Calif.

[21] Appl. No.: 755,827

[22] Filed: Jul. 17, 1985

[51] Int. Cl.$^4$ ............... B01J 27/14; B01J 21/02; B01J 27/188; B01J 27/19

[52] U.S. Cl. ............... 502/208; 502/201; 502/210; 502/211; 502/214; 502/221; 208/111

[58] Field of Search ............ 502/201, 208, 210, 211, 502/214, 221

[56] References Cited

U.S. PATENT DOCUMENTS

| | | | |
|---|---|---|---|
| 2,301,913 | 1/1943 | Veltmann | 502/210 |
| 2,441,297 | 5/1944 | Stirton | 502/208 |
| 2,926,207 | 2/1960 | Folkins et al. | 260/683.65 |
| 2,935,544 | 5/1960 | Miller et al. | 260/683.65 |
| 3,078,221 | 2/1963 | Beuther et al. | 208/111 |
| 3,078,238 | 2/1963 | Beuther et al. | 502/219 |
| 3,493,517 | 2/1970 | Jaffe | 502/211 |
| 3,516,927 | 6/1970 | Jaffe | 208/143 |
| 3,544,452 | 12/1970 | Jaffe | 208/216 |
| 3,554,926 | 1/1971 | Statman et al. | 502/214 |
| 3,617,528 | 11/1971 | Hilfman | 208/216 |
| 3,649,523 | 3/1972 | Bertolacini et al. | 208/211 |
| 3,682,813 | 8/1972 | Dun et al. | 208/59 |
| 3,684,695 | 8/1972 | Neel et al. | 208/110 |
| 3,776,839 | 12/1973 | Ladeur | 208/110 |
| 3,791,967 | 2/1974 | Jaffe | 208/216 |
| 3,793,191 | 2/1974 | Billon et al. | 208/59 |
| 3,803,026 | 4/1974 | Jaffe | 208/111 |
| 3,867,279 | 2/1975 | Young | 208/114 |
| 3,912,620 | 10/1975 | Gallagher | 208/210 |
| 3,962,134 | 6/1976 | Coff | 502/214 X |
| 3,966,642 | 6/1976 | Black et al. | 208/111 |
| 4,066,572 | 1/1978 | Choca | 502/208 |
| 4,080,311 | 3/1978 | Kehl | 526/226 |
| 4,158,621 | 6/1979 | Swift et al. | 502/214 |
| 4,210,560 | 7/1980 | Kehl | 502/208 |
| 4,228,036 | 10/1980 | Swift et al. | 502/214 |
| 4,233,184 | 11/1980 | Cull | 502/211 X |
| 4,243,556 | 1/1981 | Blanton | 208/114 |
| 4,277,373 | 7/1981 | Sawyer et al. | 502/214 |
| 4,376,067 | 3/1983 | Vogel et al. | 502/208 |
| 4,382,877 | 5/1983 | Kehl | 208/216 PP |
| 4,382,878 | 5/1983 | Kehl | 208/111 |
| 4,407,730 | 10/1983 | Kehl | 502/208 |
| 4,407,732 | 10/1983 | Kehl | 502/208 |

FOREIGN PATENT DOCUMENTS

| | | | |
|---|---|---|---|
| 517920 | 10/1955 | Canada | 502/214 |
| 2730228 | 3/1978 | Fed. Rep. of Germany | 502/208 |
| 54-9185 | 1/1979 | Japan | 502/210 |

Primary Examiner—H. M. Sneed
Assistant Examiner—William G. Wright
Attorney, Agent, or Firm—Roylance, Abrams, Berdo & Goodman

[57] ABSTRACT

A catalyst composition comprising an alumina-aluminum phosphate-silica support bearing a halogen, a Group VI metal and a Group VIII metal in which the support has an average pore radius of from about 10 Å to about 300 Å, a surface area ranging from about 50 m$^2$/g to about 400 m$^2$/g and a pore volume of about 0.1 to about 1.5 cc/g. The catalyst composition is used for hydroprocessing oils and possesses significant hydrodenitrification activity.

12 Claims, No Drawings

TABLE I-continued

| | Example No. | | | | | |
|---|---|---|---|---|---|---|
| | 1 | 2 | 3 | 4 | 5 | 6 |
| Silica | 9 | 9 | 10 | 22 | 0 | 0 |
| Magnesia | 0 | 0 | 0 | 0 | 0 | 15 |
| Pore Data | | | | | | |
| Average Pore Radius, Å | 43 | 43 | 24 | 66 | 61 | 124 |
| Pore volume, cc/g | 0.64 | 0.64 | 0.37 | 0.92 | 0.66 | 1.04 |
| Surface area, m²/g | 300 | 300 | 311 | 280 | 215 | 168 |

EXAMPLES 7-13

An impregnation solution was prepared by blending 60.68 grams of nickel nitrate, 52.85 grams of ammonium metatungstate, and 8.75 grams of hydrofluoric acid in sufficient distilled water to form 135 cubic centimeters of total solution. A 135.47 gram sample of the extruded support of Example 1 was impregnated with the impregnation solution and dried at 120° C. for over 12 hours. The dried support was then calcined at 538° C. for 10 hours. The resulting calcined catalyst is designated Catalyst A. The impregnation procedure was repeated for each sample of the extruded support of Examples 3 and 4, respectively, and the resulting catalysts are designated Catalysts C and D, respectively. The impregnation procedure for the support of Example 2 (Catalyst B) differed slightly from the remaining catalysts, since the tungsten component was incorporated into the support prior to extrusion with the remaining components added by impregnation.

For comparative purposes, the impregnation procedure for Catalyst A was repeated using the support of Example 5 containing 78 mole percent alumina and 22 mole percent aluminum phosphate, but containing no silica (Catalyst E), and the support of Example 6, and alumina-aluminum phosphate-magnesia support (Catalyst F). Finally, a commercial catalyst sample was prepared containing nickel, tungsten and fluorine on a silica alumina support containing 75 weight percent silica and 25 weight percent alumina (Catalyst G). Each of the catalyst samples to be tested contained 6 weight percent nickel, 19 weight percent tungsten and 2 weight percent fluorine.

Samples of the foregoing catalysts were evaluated in a microreactor test unit. Pretreatment involved contacting the catalyst with 2.1 standard cubic feet per hour of a gas stream containing 92 percent hydrogen and 8 percent hydrogen sulfide at 400° F. (204° C.) and 35 psig (0.24 MPa) pressure for 4 hours. In addition, the catalyst was started up using 2500 ppm sulfur as dimethyl sulfide in the feedstock and this sulfur addition was maintained overnight at a reactor temperature of 600° F. (316° C.). Thereafter, a Kuwait heavy lubricating oil distillate was passed over the catalyst at a temperature of 725° F. (385° C.), a pressure of 2430 psig (17 MPa), a liquid hourly space velocity of 1.0 together with a hydrogen stream. The gas circulation rate was 7500 standard cubic feet of hydrogen per barrel. The data and test conditions are summarized in Table II, below:

TABLE II

| | | Example No. | | | | | | |
|---|---|---|---|---|---|---|---|---|
| | | 7 | 8 | 9 | 10 | 11 | 12 | 13 |
| | | | | | Catalyst | | | |
| Properties | Feedstock | A | B | C | D | E | F | G |
| Gravity, °API | 18.3 | 30.5 | 28.2 | 29.2 | 27.5 | 27.2 | 26.5 | 26.1 |
| Sulfur, wt. % | 3.6 | 0.013 | 0.036 | 0.012 | 0.053 | 0.036 | 0.10 | 0.43 |
| Nitrogen, wppm | 1300 | 1.3 | 24 | 8.5 | 31 | 34 | 124 | 268 |
| Liquid product boiling below 650° F. (343° C.), wt. % | 0 | 17.2 | 17.2 | 17.9 | 12.3 | 10.9 | 11.1 | 9.3 |
| VI of total dewaxed oil @ 750° F. (399° C.) | | 121 | 110 | 119 | 131 | 109 | 98 | 105 |

The test results set forth in Table II demonstrate that the alumina-aluminum phosphate-silica supported catalysts (Catalysts A-D) achieve significantly improved results over those of commercial catalyst (Catalyst G). For hydrodenitrification, Catalysts A-D were more than as twice as active as Catalyst G. Thus, Catalyst A achieved a reduction in nitrogen from the 1300 ppm present in the feed to 1.3 ppm and Catalyst D to 31 ppm, while the commercial Catalyst G achieved a reduction in nitrogen to 260 ppm. Moreover, Catalysts A-D of the present invention were over 50 percent more effective as hydrodenitrification catalysts as compared with the alumina-aluminum phosphate-magnesia catalyst (Catalyst F) which reduced the nitrogen level to 124 ppm. Likewise, Catalysts A-D were more effective than Catalyst E which has just alumina-aluminum phosphate as the support. Moreover, incorporation of silica as in Catalyst C improved activity, as indicated by a higher viscosity index of the product (119) over silica-free Catalyst E (109) which contained the same amount of alumina, but in which one half of the alumina phosphate has been replaced with silica.

The preparation method has some effect upon the activity of the finished catalyst. Catalysts A and B are identical in composition but differ in activity as indicated by VI, nitrogen content and API gravity. Catalyst A was prepared by impregnation of all active metals, which is the preferred preparation method. The tungsten component of Catalyst B was incorporated into the support before it was extruded, with the remaining catalytic components being added by impregnation.

What is claimed is:

1. A catalyst composition consisting essentially of a coprecipitated alumina-aluminum phosphate-silica support formed by coprecipitation of said alumina, aluminum phosphate and silica, said support bearing a halogen, a Group VI metal and a Group VIII metal wherein said support consists essentially of alumina in the range of from 50 to about 95 mole percent, aluminum phosphate in the range of from about 2 to about 40 mole percent and silica in the range of from about 0.1 to about 45 mole percent, said halogen having been supplied to said support by impregnation.

2. The catalyst composition of claim 1 wherein said support has an average pore radius of from about 10 to about 300 Å, a surface area of from about 50 to about 400 square meters per gram and a pore volume of from about 0.1 to about 1.5 cubic centimeters per gram.

3. The catalyst composition of claim 2 wherein said support has an average pore radius of from about 20 to about 100 Å, a surface area ranging from about 150 to about 350 square meters per gram and a pore volume of from about 0.3 to 1.2 cubic centimeters per gram.

4. The catalyst composition of claim 3 wherein said support has an average pore radius of from about 20 to about 70 Å, a surface area ranging from about 250 to about 325 square meters per gram and a pore volume of from about 0.35 to about 0.95 cubic centimeters per gram.

5. The catalyst composition of claim 1 wherein said support consists essentially of alumina in the amount of from about 60 to about 90 mole percent, and aluminum phosphate in the amount of from about 5 to about 30 mole percent.

6. The catalyst composition of claim 6 wherein said support consists essentially of alumina in the amount of from about 60 to about 80 mole percent, and aluminum phosphate in the amount of from about 10 to about 30 mole percent.

7. The catalyst composition of claim 1 wherein said halogen is fluorine, said Group VI metal is tungsten and said Group VIII metal is nickel.

8. The catalyst composition of claim 7 wherein said catalyst contains from 0.3 to 4 weight percent fluorine and said nickel and tungsten, in combination, are present in the range of from about 5 to about 50 weight percent.

9. The catalyst composition of claim 8 whereas said catalyst contains from 0.8 to 2.5 weight percent fluorine and said nickel and tungsten in combination are present in the range of from about 8 to about 30 weight percent.

10. The catalyst composition of claim 5 wherein said support consists essentially of silica in the amount of from about 1 to about 20 mole percent.

11. The catalyst composition of claim 5 where said support consists essentially of silica in an amount of from about 6 to 22 mole percent.

12. The catalyst composition of claim 1 wherein the halogen is fluorine.

* * * * *